United States Patent [19]
Van Den Bosch

[11] Patent Number: 5,697,453
[45] Date of Patent: Dec. 16, 1997

[54] SUBSURFACE CUTTING TOOL

[76] Inventor: Lenard Van Den Bosch, 37 Fifth Avenue, Apt. 8, Orangeville, Ontario, Canada, L9W 1G3

[21] Appl. No.: 560,746

[22] Filed: Nov. 20, 1995

[51] Int. Cl.$^6$ ............................................. A01B 1/06
[52] U.S. Cl. .................. 172/41; 172/93; 172/95; 172/101; 172/110; 30/351; 30/353; 30/356; 30/357
[58] Field of Search ................... 172/41, 42, 93, 172/95, 92, 91, 101, 110, 378; 30/216, 351, 353, 356, 357

[56] References Cited

U.S. PATENT DOCUMENTS

| 470,981 | 3/1892 | Burritt | 172/378 |
|---|---|---|---|
| 584,746 | 6/1897 | Parcells | 172/378 |
| 634,158 | 10/1899 | Williams | 172/378 |
| 800,872 | 10/1905 | Newcomb | 172/378 |
| 1,594,277 | 7/1926 | Stanley | 172/41 X |
| 1,801,017 | 4/1931 | Major | 172/101 X |
| 3,444,934 | 5/1969 | Alberto | 172/25 |
| 3,530,577 | 9/1970 | Franklin et al. | 30/169 |
| 3,548,953 | 12/1970 | Richardson, Sr. | 172/101 X |
| 3,982,593 | 9/1976 | Grobey | 172/40 |
| 4,122,601 | 10/1978 | Katsuya | 172/41 X |
| 4,122,902 | 10/1978 | Alexander | 172/41 |
| 4,305,470 | 12/1981 | Anderson | 172/41 |
| 4,353,422 | 10/1982 | Bennett, Jr. | 172/41 |
| 4,452,316 | 6/1984 | Edwards | 172/41 |
| 5,390,746 | 2/1995 | Page | 172/371 |
| 5,452,769 | 9/1995 | Markert | 172/378 X |

FOREIGN PATENT DOCUMENTS

| 559065 | 7/1957 | Belgium | 172/41 |
|---|---|---|---|
| 1109718 | 9/1981 | Canada | 172/93 |
| 77642 | 12/1949 | Czechoslovakia | 172/93 |
| 1800229 | 5/1970 | Germany | 172/41 |
| 2037748 | 2/1972 | Germany | 172/41 |
| 973043 | 11/1982 | U.S.S.R. | 172/378 |
| 718819 | 11/1954 | United Kingdom | 172/41 |
| 842871 | 7/1960 | United Kingdom | 172/41 |

*Primary Examiner*—Terry Lee Melius
*Assistant Examiner*—Christopher J. Novosad
*Attorney, Agent, or Firm*—Peter R. Hammond

[57] ABSTRACT

A subsurface weed tool which makes use of a variety of different detachable blade attachments to cut the roots of and other plants. The tool can be provided with a variety of different attachments, permitting it to be used for other purposes such as aeration of the soil, removal of sod strips and lawn and garden edging. The tool comprises an elongate hollow supporting member having an upper end on which is mounted a motor. An elongate drive shaft or rod is operatively connected to the motor and extends through the supporting member to the latter's lower end. A reciprocating drive unit is mounted on this lower end and includes a drive conversion mechanism connected to the bottom end of the drive shaft and capable of converting rotary motion to a reciprocating linear motion in a certain direction. A blade attachment is connectible to the conversion mechanism and can include a planar blade member with a forward cutting edge. In use of the tool, this blade member extends generally horizontally and the supporting member slopes downwardly and forwardly from its upper end. The blade member is reciprocated rapidly in a rear to front direction.

27 Claims, 9 Drawing Sheets

SUBSURFACE CUTTING TOOL

BACKGROUND OF THE INVENTION

This invention relates to tools or machines for removing and controlling weeds and also to tools for cutting strips of grass or edging a lawn or garden.

The control of weeds and other undesirable plants in gardens and lawns can be difficult and time consuming. Various manual tools have been developed to remove weeds but the use of these can sometimes be difficult and time consuming. It is also possible to control weeds and plants by spraying or applying herbicides but the use of these may be undesirable for several reasons, including possible damage to the environment and to desirable plants or trees.

Known manual tools for weed removal include those having rods or blades connected to a handle, the rods being used to loosen the soil around the roots of the plant and the blade or blades cutting the stem of the plant or its root. It can sometimes be difficult to remove weeds with the use of such manual tools because weeds and other undesirable plants can have strong root systems or they may have root networks that are fibrous and very expansive. Removal of such root networks can result in the removal of a great deal of soil and the creation of large, undesirable holes in the ground. Some attempts have been made in past to develop motor driven tools to make it easier to remove weeds from the ground and to make it less time consuming. However, there is a need for better, more efficient power tools for accomplishing weed and plant removal without damage to the ground or desired plants that are to be retained.

U.S. Pat. No. 3,444,934 issued May 20, 1969 to C. N. Alberto describes a lawn weeder having an elongated tubular casing which may serve as a handle and through which extends a rotatable shaft. This shaft has a cutting blade fixed to its bottom end while the upper end of the shaft is connected to an electrical motor unit. The cutting blade can be manually urged downwards so that it is driven into the ground in order to mulch the roots of a weed.

U.S. Pat. No. 3,530,577 issued Sep. 29, 1970 to B. P. Franklin et al. reveals an electric tool for loosening or fluidizing the soil around the roots of a weed so that it can be removed by hand. The tool includes a frame having an interconnected motor and vibratory source supported thereon. An implement is supported by the frame and is controllably vibrated by the vibratory source. A handle is attached to the frame for control and manipulation. According to the patent specification, this tool, even though its blade has sharpened edges, will not cut the weeds or plants because of the fluidized state of the soil around the plant and weed stocks.

U.S. Pat. No. 4,305,470 issued Dec. 15, 1981 to E. J. Anderson describes a power hoe with a reciprocating cutting head. The hoe has a drive shaft that is mounted within a tubular, elongate housing and that can be driven by an electric drill. In order to provide harmonic reciprocating motion at the cutting head, there is a drive pin mounted to a drive plate at the end of the drive shaft, which pin is inserted into a piston housed in a sleeve. The piston is allowed to slide back and forth within the sleeve thus allowing the rotational motion of the drive pin to be translated into reciprocating motion at the sleeve in a direction perpendicular to the path of the piston. The sleeve is attached to the cutting head. The speed and length of the stroke of the cutting head can be varied. One difficulty with this device though is that the cutting head is reciprocated about a support rod which acts as a pivot axis and thus it moves in a rotary type motion, which may make it difficult to manipulate, particularly for some weed cutting or trimming operations.

The present power tool permits the easy cutting of roots of weeds and other undesirable plants beneath the surface of the soil. The roots can be cut quickly and without an undue amount of labour or physical exertion. Use of the present tool permits the quick removal of weeds over a substantial area without difficulty.

Also, the power tool described herein can be manufactured at a reasonable cost and, if desired, it can be provided with a variety of blade attachments, making this tool suitable for a variety of lawn and garden tasks. The tool can be powered either electrically or by the use of a gasoline power motor.

SUMMARY OF THE INVENTION

According to one aspect of the invention, a root cutting machine comprises an elongate, hollow supporting member having an upper end and a lower end; a motor mounted at the upper end of the supporting member; an elongate drive member having a top end, a bottom end and a longitudinal axis, connected at the top end to said motor for rotation about the longitudinal axis by the motor, and extending through the supporting member to the lower end; and a reciprocating drive unit mounted on the lower end of the supporting member. This drive unit includes a drive conversion mechanism operatively connected to the bottom end of the drive member and capable of converting the rotary motion of the drive member to a reciprocating linear motion in a predetermined direction. A blade attachment is connectible to the drive mechanism and has a blade member with a forwardly directed cutting edge. During normal use of the machine, the supporting member slopes downwardly and forwardly from the upper end to its lower end, a longitudinal centerline of the supporting member defining a vertical plane. During use of the machine, the blade member is reciprocated rapidly and horizontally in the predetermined direction, which is a rear to front direction in relation to the machine.

Preferably the supporting member is tubular with a round transverse cross-section and a length of at least three feet.

According to another aspect of the invention, a weed cutting power tool for cutting roots of weeds below the ground surface comprises an elongate supporting member having an upper end and a lower end, a motor mounted at the upper end of the supporting member, and a relatively thin, elongate drive member having a top end operatively connected to the motor, a bottom end, and a longitudinal central axis about which the drive member is rotatable by the motor. The drive member along the supporting member to the lower end. A reciprocating drive unit is mounted on the lower end of the supporting member and includes a drive conversion mechanism capable of converting the rotary motion of the drive member to a reciprocating linear motion which is a generally horizontal motion during use of the tool. The drive conversion mechanism includes a gear mechanism operatively connected to the bottom end of the drive member. A blade attachment is connectible to the drive conversion mechanism and has a blade member with at least one cutting edge and a blade shaft rigidly connected to the blade member. At least one shaft supporting device is mounted at the lower end of the supporting member and is arranged to support the blade shaft for reciprocating linear movement therein. In use of this tool, the blade instrument undergoes reciprocating linear motion in a generally horizontal direction.

Preferably the drive unit includes an exterior housing containing both the drive conversion mechanism and the at least one shaft supporting device. This exterior housing is rigidly connected to the supporting member.

According to a further aspect of the invention, a root cutting machine comprises a generally elongate, supporting apparatus having two opposite ends and a central longitudinal axis and a motor mounted on the supporting apparatus. There is also an elongate drive member connected to the motor and rotatable thereby, this member extending to one end of the supporting apparatus. A reciprocating drive unit is mounted on this one end and includes a drive conversion mechanism operatively connected to an end of the drive member and capable of converting the rotary motion of the drive member to a reciprocating linear motion in a predetermined direction which is at a substantial angle of substantially less than 180° to the longitudinal axis of the supporting apparatus. A blade attachment is connectible to the drive conversion mechanism and has a blade member with a cutting edge. During use of the machine, the blade attachment is reciprocated rapidly and linearly in the predetermined direction by the motor.

In one embodiment, the motor is an electric motor mounted adjacent or near the lower end of the supporting apparatus, that is, the end with the reciprocating drive unit.

Further features and advantages will become apparent from the following detailed description taken in conjunction with the drawings.

DETAILED DESCRIPTION OF PREFERRED EMBODIMENTS

Figure 1:
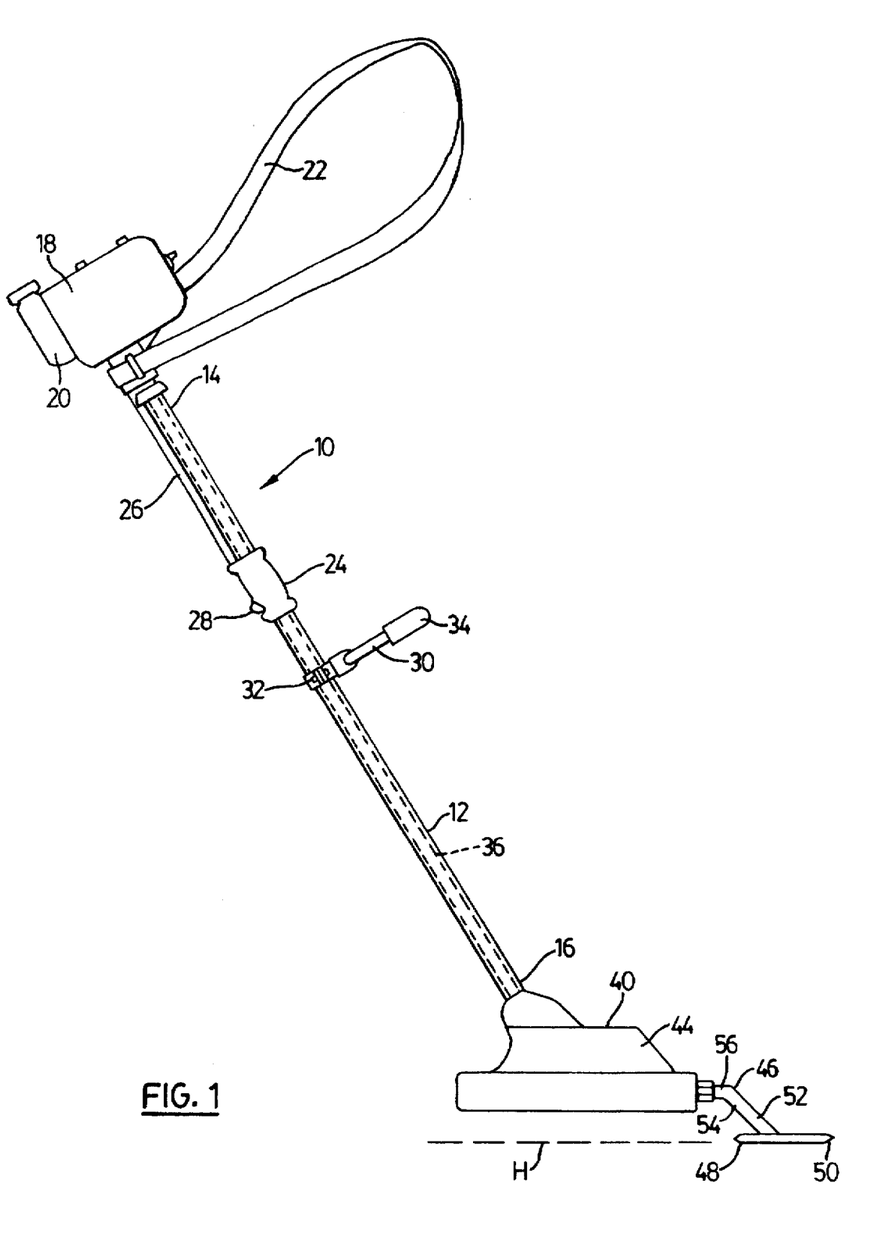
FIG. 1 is a side elevation of a root cutting machine constructed in accordance with the invention, this machine being shown in its working position.

A root cutting machine or power tool 10 constructed in accordance with the invention is shown in FIG. 1 and includes an elongate, hollow supporting member 12 having an upper end 14 and a lower end 16. Preferably the supporting member is tubular with a round cross-section and, at least in the versions of FIGS. 1 and 2, has a length of at least 3 feet and preferably at least 4 feet. The member 12 should be sufficiently strong to support the various components of the machine and it can be made of steel or a lighter metal. A motor 18 is mounted at the upper end 14 of the supporting member. The motor illustrated in FIG. 1 is a gas driven motor but an electrical motor could also be used, particularly if the machine is to be used in locations having ready access to electrical power. As the gas driven motor 18 is of standard construction, a detailed description thereof is deemed unnecessary. The motor can be equipped with a small gas tank at 20. The motor can, for example, be similar to those currently used on known, portable weed cutting machines which employ a flexible line attached to a rotating disc to cut weeds or grass. A flexible and preferably adjustable leather strap 22 can be provided at the upper end of the machine to enable a user to support and hold the machine for a lengthy period of time. The motor is preferably provided with a fuel throttle mechanism controlled by means of a throttle lever on a control handle 24. The control handle is operatively connected to the motor by a control wire or wires extending through flexible metal tube 26. Again, the manner in which the motor is controlled or throttled does not form part of the present invention and is therefore not described in detail herein. Throttle controls for small motors are well known and are used, for example, in lawn mowers having gasoline engines and other known weed cutting tools. The lever control for the motor is shown at 28. Also connected to the supporting tube 12 is a gripping handle 30 which can be rigidly connected at a suitable location along the tube. Preferably the position of the handle 30 is adjustable by loosening and tightening bolts or screws at 32. Also, preferably the gripping handle is located along the upper half of the supporting member 12. The handle 30 may be provided with a foam rubber cover or grip at 34 to make the machine easier to handle and to reduce the extent of the vibrations passed through the handle to the user's hand and arm.

An elongate drive member 36, preferably in the form of a narrow, round drive shaft, is operatively connected at its top end to the motor 18 for rotation by the motor. The top end of the member 36 is connected to the output shaft of the motor 18. The drive member 36 extends through the supporting member 12 for its entire length and thus extends to the lower end 16 of the supporting member. Suitable ball bearing supports for the shaft can be provided along the member 12 if required for additional support. It will be appreciated that the drive member 36 has a longitudinal axis extending along the centre thereof, which axis is indicated at A in FIG. 3 where a bottom end portion of the drive member is shown. This longitudinal axis is normally co-axial with the longitudinal centerline of supporting tube 12. In the working position of the machine shown in FIG. 1, the longitudinal centerline of the supporting member 12 defines a vertical plane since the supporting member slopes downwardly and forwardly from the upper end 14 to the lower end 16.

Figure 3:
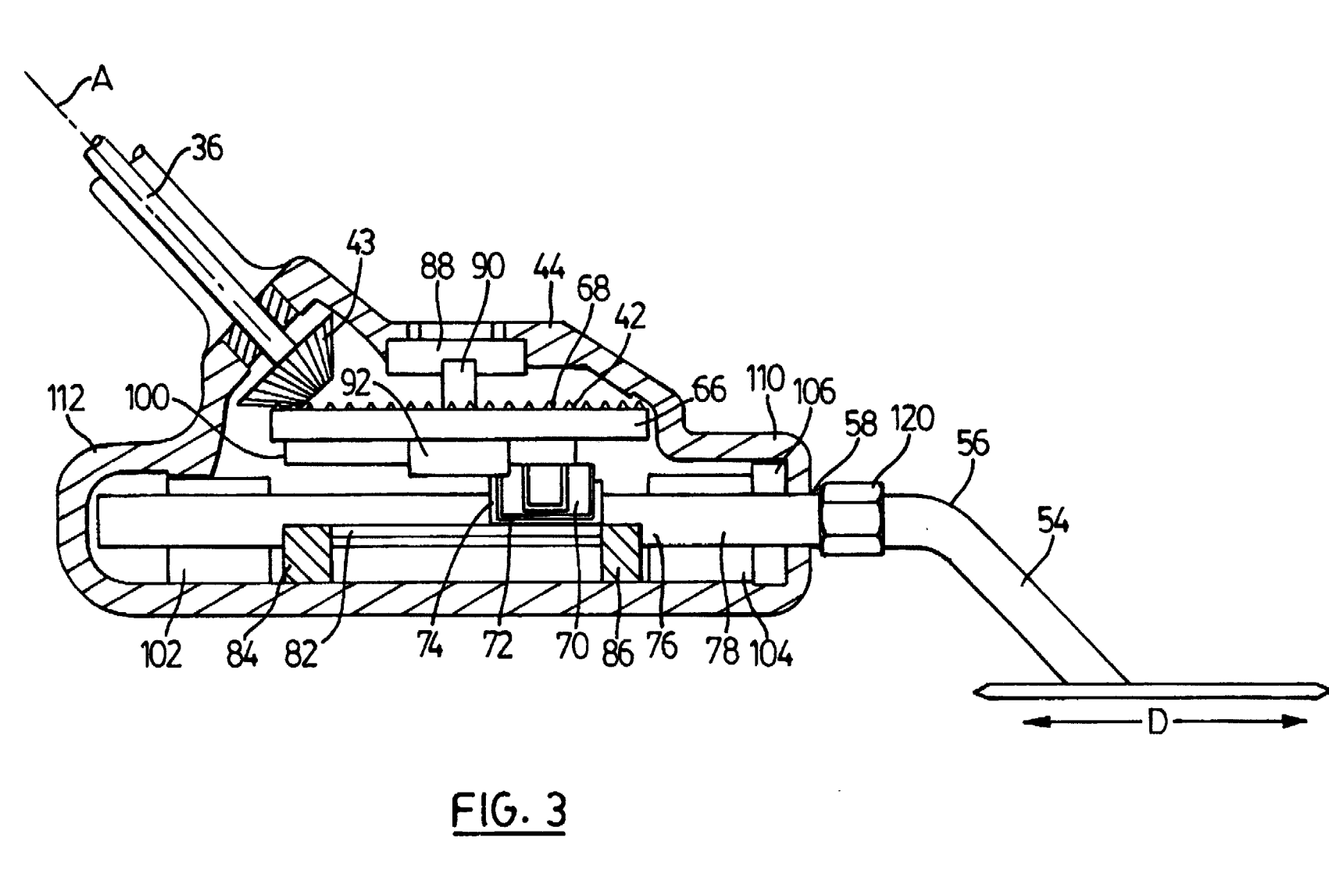
FIG. 3 is a schematic, cross-sectional elevation of one embodiment of a reciprocating drive unit that can be provided in the machine of FIG. 1 or that of FIG. 2.

A reciprocating drive unit 40 is mounted on the lower end 16 of the supporting member or tube 12. This drive unit includes a drive conversion mechanism 42, one version of which is shown in detail in FIGS. 3 to 5. This drive conversion mechanism is operatively connected to the bottom end of the drive member 36 and it is capable of converting the rotary motion of the drive member to a reciprocating linear motion in a predetermined direction indicated by the arrows D in FIG. 3. In the version of FIG. 3, the bottom end of the drive member is rigidly connected to a bevelled drive gear 44. Preferably the drive unit 40 includes an exterior housing which can be made of strong rigid plastic and which contains the drive conversion mechanism 42. This housing 44 is rigidly connected to the lower end 16 of the supporting member.

Figure 2:
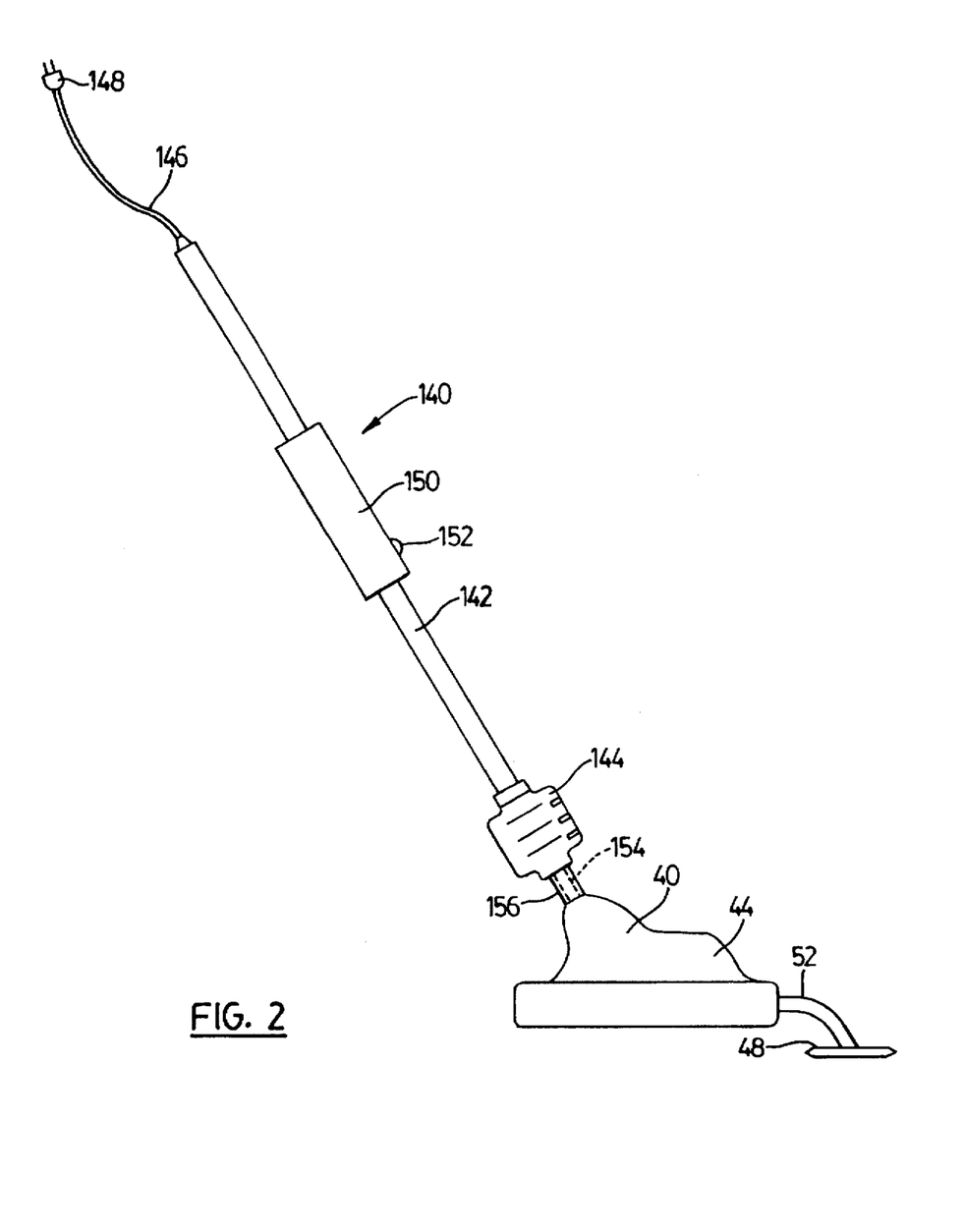
FIG. 2 is a side elevation of another embodiment of a root cutting machine equipped with an electrical motor, this embodiment also being shown in its working position.

The machine or power tool 10 includes a blade attachment indicated generally at 46, this attachment being connectible to the drive conversion mechanism 42. Although a variety of blade attachments can be connected to the conversion mechanism 42 of the machine, a preferred blade attachment for root or weed cutting has a generally planar blade member 48 with a forward cutting edge 50. As shown in FIGS. 1 and 2, the blade member is connected so that, during normal use of the machine 10, the blade member extends generally in a horizontal plane indicated by the dashed line H. In this position of the blade member, the supporting member 12 extends downwardly and forwardly from its upper end to its lower end as shown. It will be appreciated that during use of the machine, the blade member 48 can be reciprocated rapidly and horizontally in a predetermined direction, which is a rear to front direction in relation to the machine 10.

The blade attachment 46 includes a blade shaft 52 rigidly connected to the blade member 48. The blade shaft has a lower shaft section 54 that extends upwardly from the blade member and an upper shaft section 56 that extends generally parallel to the plane of blade member 48 and rearwardly. The housing 44 has a front opening 58 permitting a reciprocating drive shaft 78 to extend forwardly out of the housing where it is detachably connected to the shaft section 56 (as explained further below).

Figure 13:
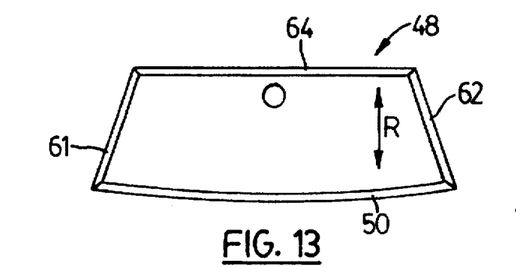
FIG. 13 to 19 are plan views of various forms of blades that can be used with the power tool of the invention.

Further details of the blade member 48 are shown in FIG. 13. The blade member 48 is a regular weeding blade designed to cut the roots of weeds and other undesired plants below the ground's surface. The preferred blade member has a slightly convexly curved forward cutting edge at 50 and two opposite side edges 61 and 62 which taper inwardly from front to back. There is also a straight rear edge 64 which can be sharpened as can the side edges. By sharpening all four edges, the blade is able to move easily under the ground surface and all of the edges are able to do some root cutting.

Figure 4:
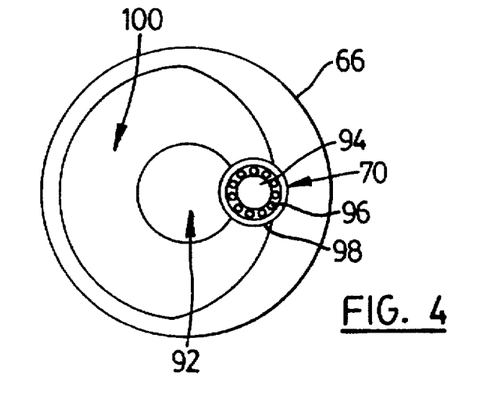
FIG. 4 is a detail plan view showing the construction of a rotatable drive extension used in the drive unit of FIG. 3.
Figure 5:
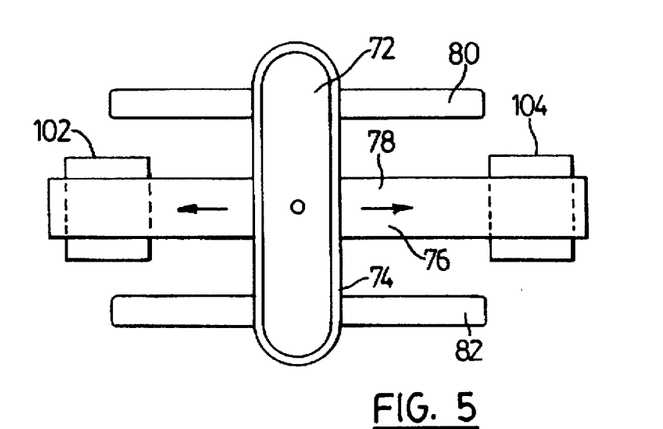
FIG. 5 is another detail plan view illustrating the construction of an elongate drive chamber and the manner in which it is mounted on a reciprocating drive shaft.

Turning now to a preferred drive unit illustrated in FIGS. 3 to 5, the aforementioned drive gear 43 is part of a gear mechanism operatively connected to the bottom end of the drive member 36. This gear mechanism includes a rotatable driven gear 66 which is engaged by the bevelled gear 43 and which has a series of teeth 68 extending about the perimeter of its upper surface. The illustrated driven gear 66 is in the form of a rotatable disc. Connected to the bottom surface of this disc is an offset downward extension or drive extension 70. This extension extends into an elongate slot or chamber 72, the shape of which can be seen in plan view in FIG. 5. The slot 72 is formed in an elongate holder 74 which is part of a drive connecting member indicated generally at 76. The connecting member 76 includes the reciprocating drive shaft or rod 78 to which the holder 74 is rigidly connected. The slot 72 extends in a direction perpendicular to the centerline of the shaft 78, the center of the slot being directly above the centerline of the shaft. The holder 74 and the shaft 78 are prevented from rotating about the centerline of the shaft by two elongate slide bars 80 and 82. The bars 82 can be rigidly mounted in the housing 44 by means of integral supports 84 and 86 formed in the housing.

Also shown in FIG. 3 is an upper pivot pin support or bearing 88 mounted in a top wall of the housing. Extending into this support is a pivot pin 90 which extends through a hole in the center of driven gear 66 to a circular head or plate 92 rigidly connected to the pin. The bottom of the gear or disc 66 is shown in FIG. 4. Located in the center of the disc is the circular head or plate 92 which helps to rotatably support the disc 66 from below. The plate 92 may be provided with ball bearings on its upper surface to better rotatably support the disc 66. The downward extension 70 includes a central stub shaft and an inner bearing sleeve at 94. Ball bearings at 96 rotatably support an outer bearing sleeve 98, the outer diameter of which is only slightly less than the width of the slot 72. A generally flat, downward extension of the disc 66 forms an offset counterbalance at 100. The counterbalance acts to reduce the vibration that would otherwise be caused by rapid rotation of the disc 66. It will thus be appreciated that rotation of the gear disc 66 causes the downward extension 70 to move back and forth in the slot 72. Furthermore, because the extension 70 will also move in a rear to front direction and visversa as the disc rotates, it will force the connecting member 76 to move with it in a rear to front direction, in other words, in a reciprocating linear motion. The drive shaft 78 is guided during the course of this motion by two shaft bushings or bearings at 102 and 104. The interior of these bushings can be made of any suitable low friction and long wearing material such as brass or a hard plastic. Preferably a shaft seal is provided at 106 to protect the bushing from incoming dirt and other foreign matter. The bushings are fixedly mounted in the housing 44. The bushings are shaft supporting devices and although the use of two of such devices is shown, it will be appreciated that a single bushing or supporting device of suitable construction could also be used. In the preferred version shown, the two bushings are spaced apart and are fixedly mounted respectively near the front end 110 and the rear end 112 of the housing.

Figures 6, 7, 8:
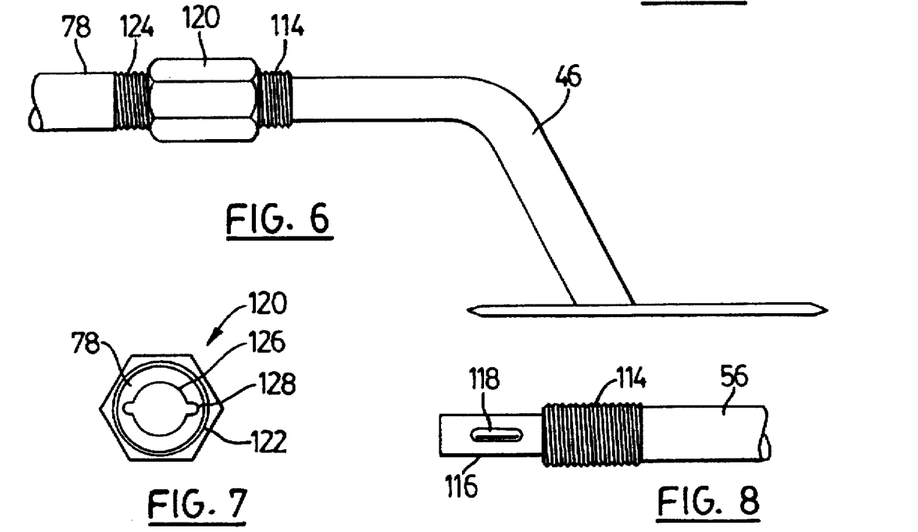
FIG. 6 is a detail view showing a blade attachment and how it can be detachably connected to the reciprocating drive shaft of the drive unit.
FIG. 7 is an end view of the threaded nut and the drive shaft used in the attachment mechanism of FIG. 6.
FIG. 8 is a detail side view showing a preferred form of threaded end for the blade attachment.

Preferably the blade attachment 46 is detachably connected to the drive unit. In this way, one particular form of blade attachment can be replaced with other types of attachments, variations of which are detailed hereinafter and are shown in FIGS. 14 to 24 of the drawings. One form of connecting mechanism for the blade attachment is illustrated in FIGS. 6 to 8. FIG. 8, in particular, illustrates the rear end section of the shaft section 56 of a blade attachment. This rear end section is threaded at 114 and extending rearwardly from these threads is a shaft extension 116 having two elongate, locking beads 118 formed on opposite sides thereof. The shaft section 56 is detachably connected to the reciprocating drive shaft 78 by means of a threaded shaft nut 120. The shaft nut is internally threaded at 122 and it is threaded onto threads 124 formed on the end of the drive shaft 78. The end section of the shaft 78 is formed with a central passageway 126 sized to snugly receive the shaft extension 116. Also formed in this passageway are two elongate slots 128 which are open at their forward ends and which are sized to receive the beads 118. In this way, insertion of the extension 116 into the passageway 126 secures the blade attachment against rotation relative to the shaft 78. It is then simply necessary turn the shaft nut 120 so that the internal threads thereof engage equally both the threads 124 on the shaft 78 and the threads at 114.

Another version of a root cutting power tool constructed in accordance with the invention is shown in FIG. 2 of the drawings. This tool 140 also has an elongate, hollow member 142 which may be a tube with a circular cross-section. In this embodiment, an electric motor 144 is mounted near or at the lower end of the supporting member 142. The motor 144 can be provided with 120 volts of electrical power through electrical cord 146 which can extend down through the tube 142 to the electric motor. The cord 146 is provided with a plug 148 which would permit it to be connected to an extension cord. Preferably, a cushioned handle grip 150 is fixedly mounted on and extends along the tube 142 in a central section thereof. This grip makes the tool easier to hold and support, particularly for extended periods of time. Mounted in the grip can be a standard on-off switch 152. There could also be a lever or other manual control device mounted in the vicinity of the grip 150 for varying the speed of the electrical motor 144. This speed control can be similar to those provided, for example, in many electrical handheld drills.

It will be appreciated that although the tool 140 also has a drive shaft, this shaft is much shorter than that in the FIG. 1 version and is indicated in dashed lines at 154. Unless the electrical motor 144 is mounted directly on the housing of the drive unit 40, which is possible, the short extension 156 of the supporting member 142 extends between the electric motor and the housing 44.

If desired, a shock reducing or vibration reducing device can be mounted in the supporting member 142 or be part thereof. This device may comprise a solid rubber connector mounted along the portion of the supporting member extending between the grip 150 and the electric motor. Such a device can also reduce the transmission of vibrations to the hands and arms of the user during operation of the tool.

Figure 9:
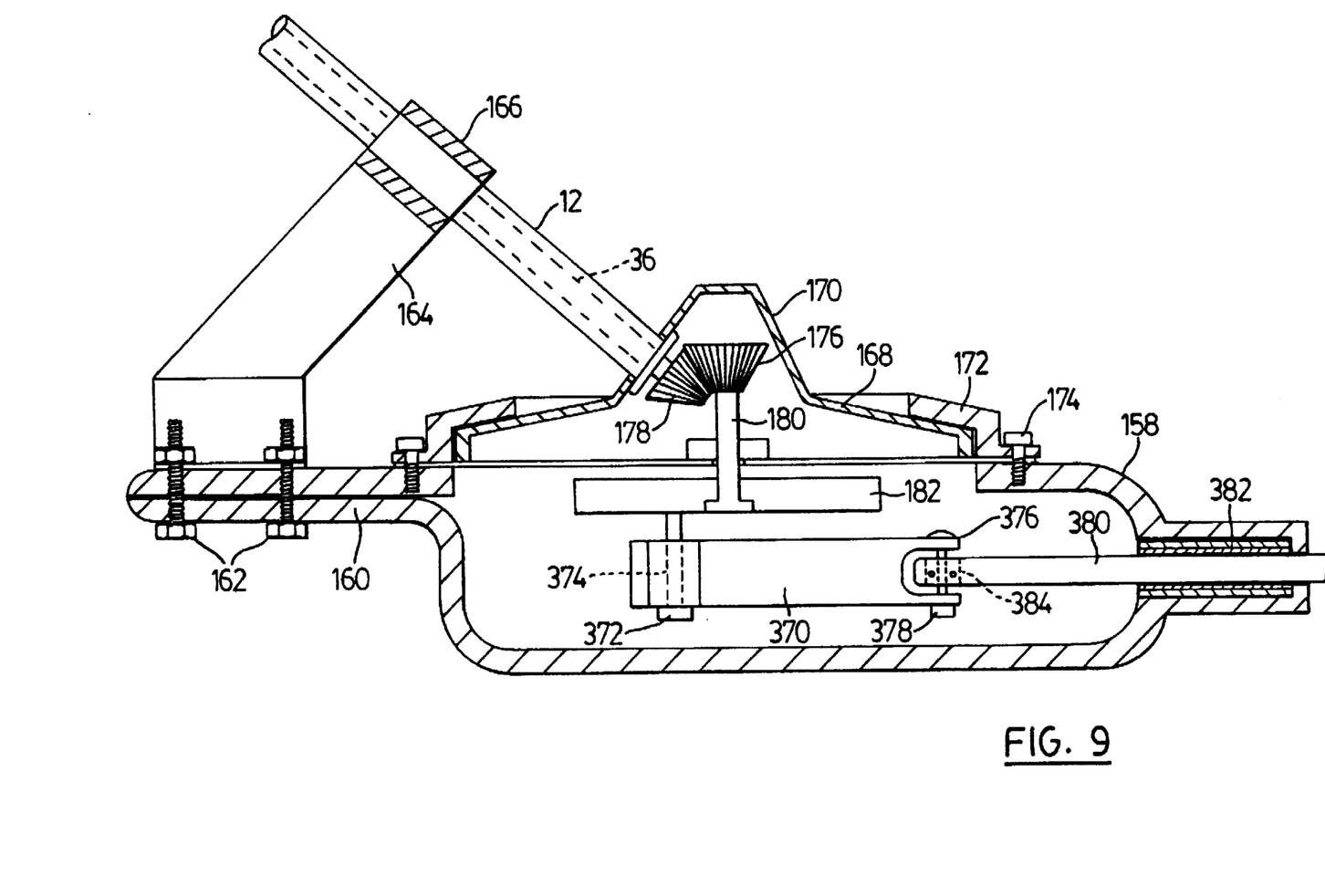
FIG. 9 is a side elevation similar to FIG. 3 but showing another version of a reciprocating drive unit for the root cutting tool.

FIG. 9 illustrates an alternative form of drive unit for the power tool of the invention. In this embodiment, there is a supporting member 12 similar to that in the embodiment of FIG. 1. Through this member extends a rotatable drive member or shaft 36. Mounted at the bottom end of the supporting member is a housing 158 which has a rearward extension 160. Through the extension extend two or more bolts 162 which detachably connect a supporting bracket 164 to the extension. The upper end of the bracket is a sleeve section 166 through which the supporting member 12 extends. Preferably the sleeve section is clamped to the member 12 to provide a rigid connection.

The housing includes a cover member 168 with a central truncated cone 170 that extends upwardly. The member 168 is detachably connected to the main section of the housing by means of an annular clasp 172. This clasp is attached by means of a number of bolts 174 to the main housing section. Located in the cone 170 is a driven bevel gear member 176. This gear is turned about a vertical axis by a bevel drive gear 178. The gear 178 is rigidly connected to the drive shaft 36 and is turned thereby. A vertical post 180 is connected to the gear 176 and extends down to a drive wheel or disc 182. The drive wheel 182 is connected to an arm or driving linkage 370 by means of a pivot pin or bolt 372. Preferably the bolt shank extends through a roller or ball bearing 374 mounted in the end of the linkage 370 for free, long lasting rotational movement. The forward end of linkage 370 is formed with a connecting fork 376 through which extends another pivot pin 378. This pin 378 connects the linkage to reciprocating drive shaft 380 which moves in a linear manner in a bearing/bushing 382. Preferably the pin 378 extends through a roller or ball bearing 384 mounted in the rear end of the shaft 380 for free, long lasting, pivotal movement. The shaft 380 is connected to the blade attachment (not shown) in the manner already described.

Figure 10:
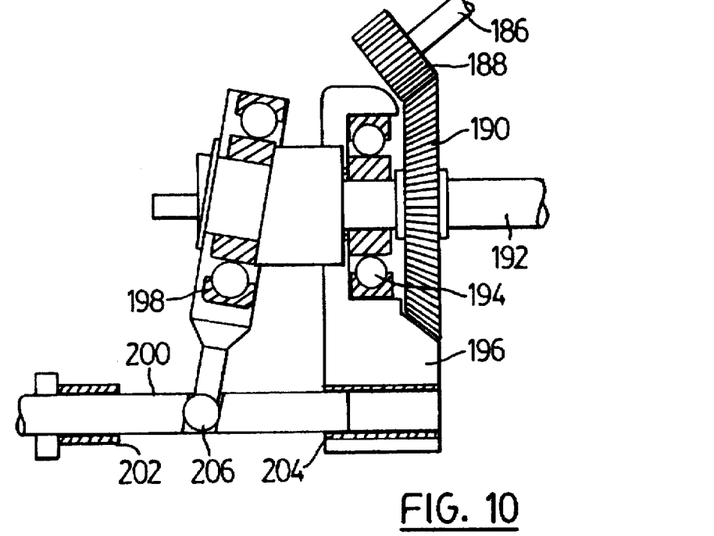
FIG. 10 is a schematic side view of an alternative gear mechanism for converting rotary drive to reciprocating linear motion for the tool of this invention.

Another form of reciprocating drive mechanism that can be used in the power tool of the invention is illustrated in FIG. 10 wherein only the drive conversion mechanism is illustrated and not the surrounding housing in which this mechanism would be mounted. The elongate drive member extending downwardly from the motor is indicated at 186. It is connected to a pinion gear 188 which acts as a drive gear to rotate a large, driven bevel gear 190. This gear is mounted on a horizontally extending drive shaft 192 which is rotatably supported by means of ball bearing units, one of which is shown at 194. This bearing is mounted in support bracket 196 which can be rigidly connected to the exterior housing. The shaft 192 is connected to a swivel-type bearing 198 which is pivotably connected to a reciprocating drive shaft 200, slidably mounted in bushings 202 and 204. The shaft 200 is of course connected to the blade attachment (not shown). It will be appreciated by those skilled in the art that rotation of the shaft 192 will cause the swivel bearing 198 to pivot back and forth about a central pivot axis that extend through the central longitudinal axis of the shaft 192. The attachment ball 206 at the bottom of the swivel bearing is able not only to pivot relative to the drive shaft 200 but is also able to move vertically relative to the shaft to provide the required movement. Further detailed description of the operation of the swivel bearing herein is deemed unnecessary as the use of such bearings is well known in mechanical drive systems.

Figures 11, 12:
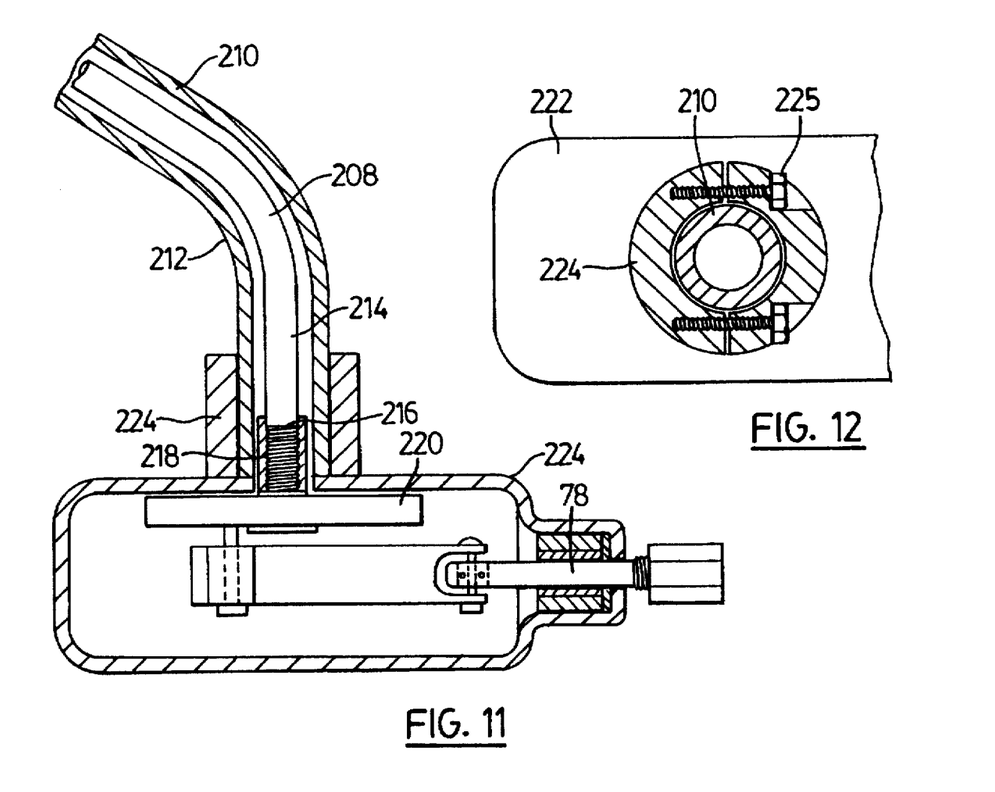
FIG. 11 is a cross-sectional elevation similar to FIG. 3 and showing an alternate form of elongate drive member and how this member is connected to a reciprocating drive unit.
FIG. 12 is a detailed top view showing the manner in which the hollow supporting tube shown in FIG. 11 is connected to the housing of the reciprocating drive unit.

FIGS. 11 and 12 illustrate another form of drive member that can be used in the weed cutting tool of the invention. In this embodiment, the elongate, drive member comprises a strong, flexible drive or turning cable 208. This cable can, for example, be made of a suitable spring steel. This drive cable extends through an elongate, hollow supporting member 210 in which is formed a substantial bend 212. Because the turning cable 208 is flexible, it also can bend so that the bottom section 214 thereof effectively rotates about a vertical axis. The bottom end of the cable has a threaded spindle 216 to which it is fixedly attached. This spindle has internal threads at 218 which permit it to be connected to a threaded post extending upwardly from rotating drive disc 220. Disc 220 is rotatably mounted in an exterior housing 222. The supporting member 210 is rigidly connected to this housing by means of a split ring collar 224. Two bolts 225 are used to clamp the collar about the exterior of the supporting member. The collar is connected to the top of the housing. The disc 220 is rotatably supported by means of a vertical bolt 226 that extends through a hole in the bottom of the housing. The disc 220 may operate in a similar fashion to the drive disc 182 of the FIG. 9 version. The disc 220 is part of a drive conversion mechanism which is similar to that of FIG. 9 except for the differences noted above. This mechanism causes the shaft 78 to reciprocate in a linear fashion.

Various forms of alternative blade members are illustrated in FIGS. 14 to 24 of the drawings. All of these blade members can be used with the root or weed cutting machines described above. In the blade attachment of FIG. 14 there is a blade member 230 which can also be used to cut the roots of weeds beneath the ground surface. This blade member is similar in shape to that shown in FIG. 13 but its two side edges 232 and 234 are serrated which can provide increased cutting action in certain applications. Again, the forward edge 236 is slightly curved and is sharpened. The blade member is connected to a blade shaft at 240. In this embodiment, the side edges are both substantially shorter than both the forward cutting edge 236 and rear edge 238.

Figure 15:
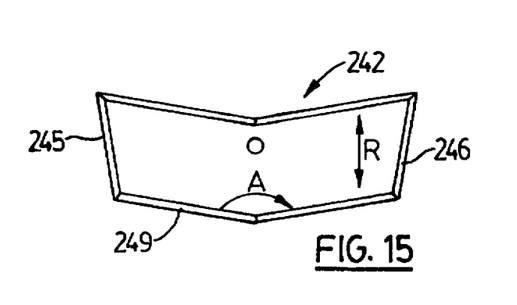

An angled cutting blade 242 is shown in FIG. 15 and it will be appreciated that this blade can come in different sizes, the size used depending upon the particular application. In the version of FIG. 15, all of the edges are sharpened, including the forward cutting edge 244. The angle A formed by the forward cutting edge is a substantial obtuse angle approaching 180°. In this version the side edges 245 and 246 taper inwardly towards one another in the direction of the front edge.

Figure 14:
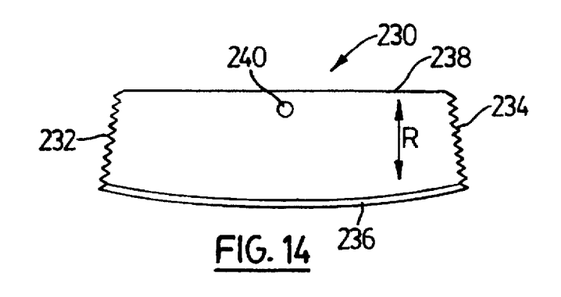

All of the blade members of FIGS. 13 to 15 are designed to be reciprocated in a rear to front direction as indicated by the arrows R.

Figure 16:
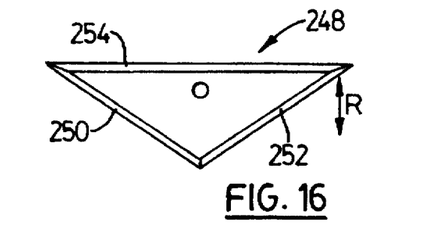

FIG. 16 illustrates another form of cutting blade for the present power tool. This blade 248 has the shape of a triangle with two forward edges 250 and 252 of equal length. All three edges are sharpened for cutting action. This blade member reciprocates in a direction perpendicular to rear edge 254.

Figure 17:
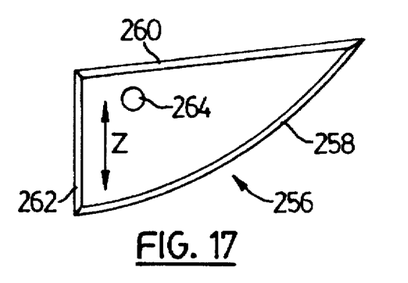

The blade member 256 of FIG. 17 is designed for cutting the roots of weeds along the edges of gardens or walkways. It is reciprocated in the direction indicated by the arrow Z. This blade member has a convexly curved forward cutting edge 258, a straight rear edge 260 and a straight side edge 262. Again, all three edges are preferably sharpened for cutting purposes. The blade member is connected to a blade shaft at 264.

Figure 18:
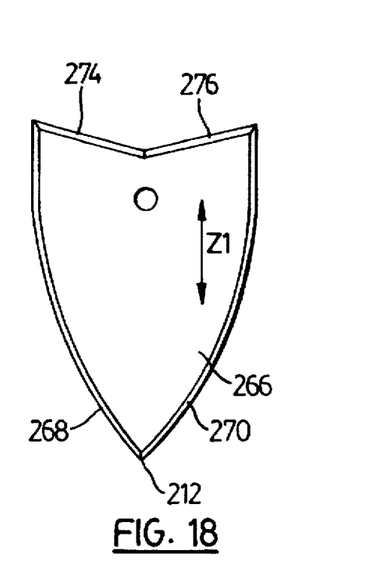

FIG. 18 illustrates another form of planar blade member 266, this member having the general shape of a spear head. It is reciprocated in the direction indicated by the arrow Z1. It has two opposite convexly curved edges 268 and 270 which meet at a forward point 272. There are two rear edges 274 and 276 which form a large obtuse angle relative to each other.

Figure 19:
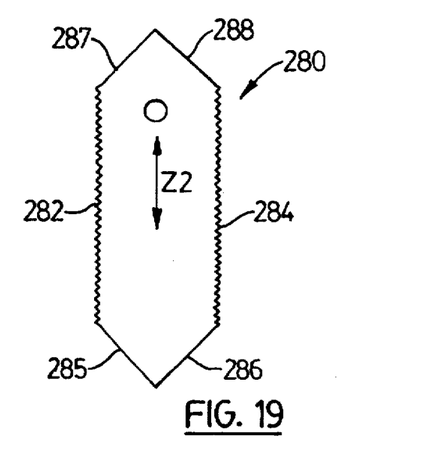

The blade member of FIG. 19 is quite different in its construction and may be particularly suitable where a saw type cutting action is required to cut the roots of the plants. This blade member 280 has two long serrated side edges 282 and 284 as well as two, shorter front edges 285 and 286 which form an angle of almost 90° to one another. There are also two short rear edges 287 and 288 which form a substantial angle to one another. This blade member is designed to reciprocate in the front to rear direction indicated by the arrow Z2. In order to use this blade member to cut roots, it will be understood that the blade member would normally be moved against the side of the root in a direction perpendicular to the reciprocating linear motion.

Figure 20:
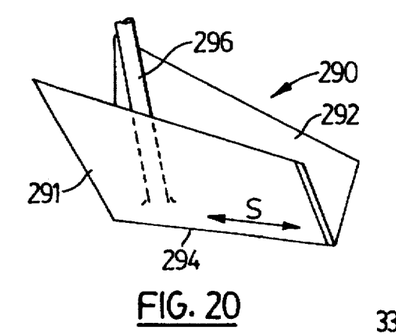
FIG. 20 is a perspective view taken from the front and right side showing a farrowing blade that can be used with the power tool.

The blade attachment of FIG. 20, unlike those of FIGS. 13 to 19, employs a non-planar blade member. Its blade member 290 is generally V-shaped as seen from its front end. The blade member 290 can be used to form a seed furrow in the ground as it is capable of cutting a V-shaped trench. This blade member reciprocates in the direction of the arrow S. The member comprises two blade sections 291 and 292 which meet along a central, bottom edge 294. The blade member 290 is connected to a blade shaft 296 near the bottom rear corner of the blade member.

Figure 21:
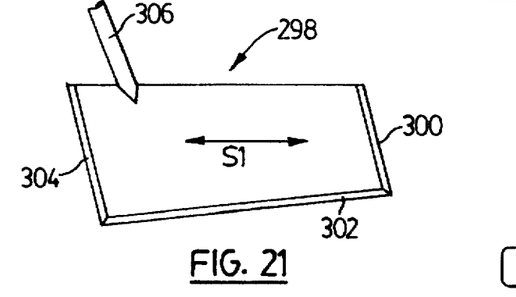
FIG. 21 is a side view of another form of cutting blade that can be used with the present power tool.

An edge cutting blade 298 suitable for use with the present root cutting machine is shown in FIG. 21. This blade has at least a sharpened forward edge 300 but its bottom edge 302 and its rear edge 304 may also be sharpened. The blade member has a blade shaft 306 extending upwardly from its upper edge. It will be appreciated that with the use of this edge cutting blade, it is easy to cut sod along a vertical plane, for example, to trim a garden or perhaps to remove sod in order to create a garden or pathway. The blade member reciprocates in a front to back linear direction as indicated by the arrow S1. The bottom edge 302 preferably slopes slightly downwardly from front to back corners so this bottom edge will also provide some cutting action.

Figure 22:
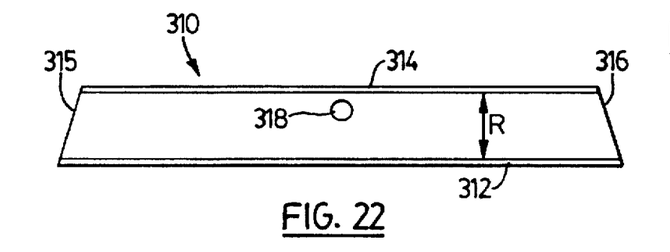
FIG. 22 and 23 are plan views of additional forms of cutting blades that can be used with the present power tool.

The wide blade 310 shown in FIG. 22 is designed particularly to cut a strip of sod or grass below ground level. Its long front edge 312 is sharpened for cutting action and its rear edge 314 may also be sharpened. Its side edges 315 and 316 are relatively short and they may taper inwardly from front to back edges. The blade shaft connects to the center of the blade member at 318. As in the versions of FIGS. 13 and 14, this blade member reciprocates in a front to back manner as indicated by the arrow R.

Figure 23:
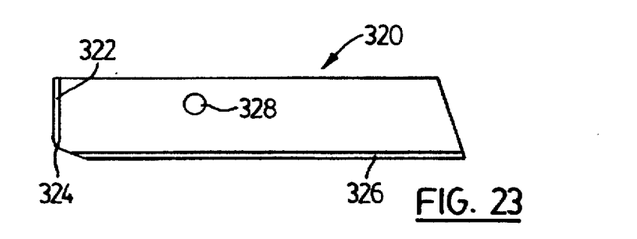

The blade member 320 shown in FIG. 23 is also used for sod cutting purposes, however this blade member is provided with an upwardly extending side bar or side wall 322 which can have its own forward cutting edge at 324. It will be appreciated that the blade member 320 cuts not only in a horizontal plane but also in a vertical plane and this can be very useful in forming sod strips of uniform width with neatly trimmed side edges. The member 320 has a long, forward cutting edge at 326 and a blade shaft at 328.

Figure 24:
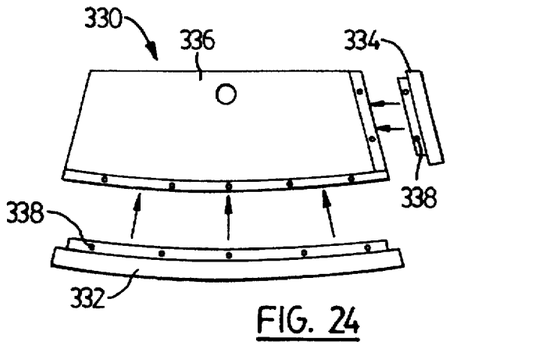
FIG. 24 is a blown apart view of another form of blade attachment with replaceable blade edges.

FIG. 24 illustrates the type of blade member 330 which may be of particular use in hard or rocky ground. This blade member is equipped with elongate, carbide blade tip replacements 332 and 334 which are detachably connected to front and side edges of the planar main blade section 336. Suitable screws extending through holes 338 formed on connecting flanges can be used to attach the tip replacements. Although only one side edge replacement is shown in FIG. 24, it will be appreciated that both side edges can be fitted with replaceable blade tips if desired. By forming the blade tips of strong, abrasion resistant carbide material, the blade member will not quickly be worn down when used in rocky ground. Also, if the tip replacement becomes broken or worn out after extended use, it is only necessary to replace the carbide tip and not the entire blade member.

Figure 25:
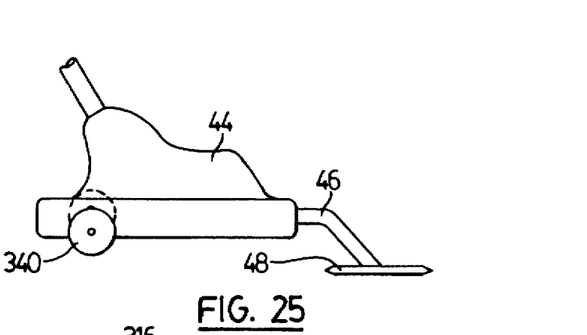
FIG. 25 is another detail showing the use of optional wheels mounted on the power tool in order to support same.

If desired, it is possible to equip the weed cutting machine of the invention with a couple of supporting wheels as indicated schematically in FIG. 25. These wheels 340 are rotatably mounted on the exterior housing 44. With the use of such wheels, it is no longer necessary for the user to support the entire weight of the power tool as it is being moved over the ground. Preferably the position of the wheels 340 is made adjustable so that the blade member 48 will be at the correct depth. Each wheel 340 can be made adjustable in a manner known per se, for example, it is a common feature of many lawn mowers that the height of the wheels can be adjusted relative to the blade housing. Often the adjustment is made by loosening a bolt member on which the wheel is mounted and then re-tightening the bolt member after the adjustment has been made. The wheels 340 on the tool of the present invention can be adjusted in a similar fashion. They can also be made detachable or movable to a position where they no longer engage the ground, which position may be desirable for some applications of the present machine.

Figure 26:
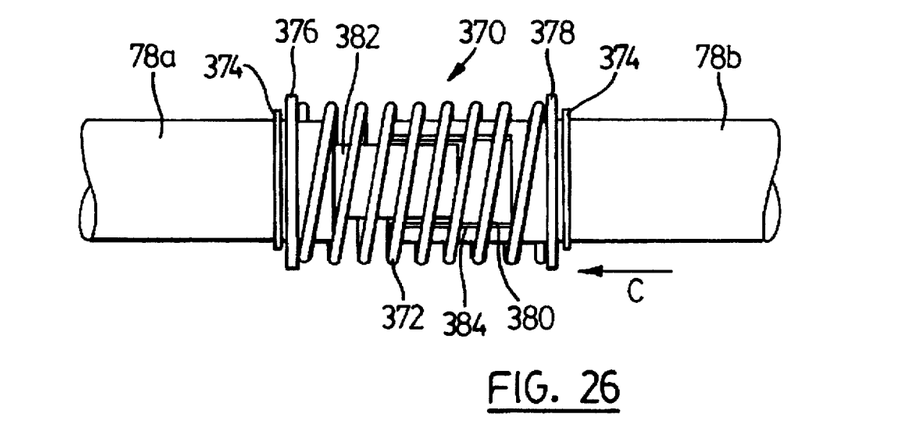
FIG. 26 is a further detail side view showing a shock absorber for the blade attachment, this absorber being located in the housing of the reciprocating drive unit.

FIG. 26 illustrates a spring-type shock absorber 370 that can be used in the invention to help absorb shocks on the blade member and blade shaft. This optional shock absorber can be mounted for example in the housing 222 of the drive unit shown in FIG. 11. Preferably it is located near the front end of the drive shaft 78 just ahead of the shaft support bushing at the blade end of the housing. The shock absorber comprises a fairly stiff coil spring 372 that is connected at its opposite ends to shaft parts 78a and 78b by means of spring clips 374. These clips are attached to annular flanges 376, 378 formed on the shaft parts. The inner end of shaft part 78b is formed with a central passageway 380 that snugly receives a shaft extension 382 formed on the end of the shaft part 78a. A thin bushing 384 is preferably inserted in the passageway 380 to slidingly receive the shaft extension and reduce wear. The shock absorber can permit the shaft part 78b to be compressed inwardly approximately ¼" to ⅜" in the direction of the arrow C. The shock absorber can be quite short, for example an inch or so.

Figure 27:
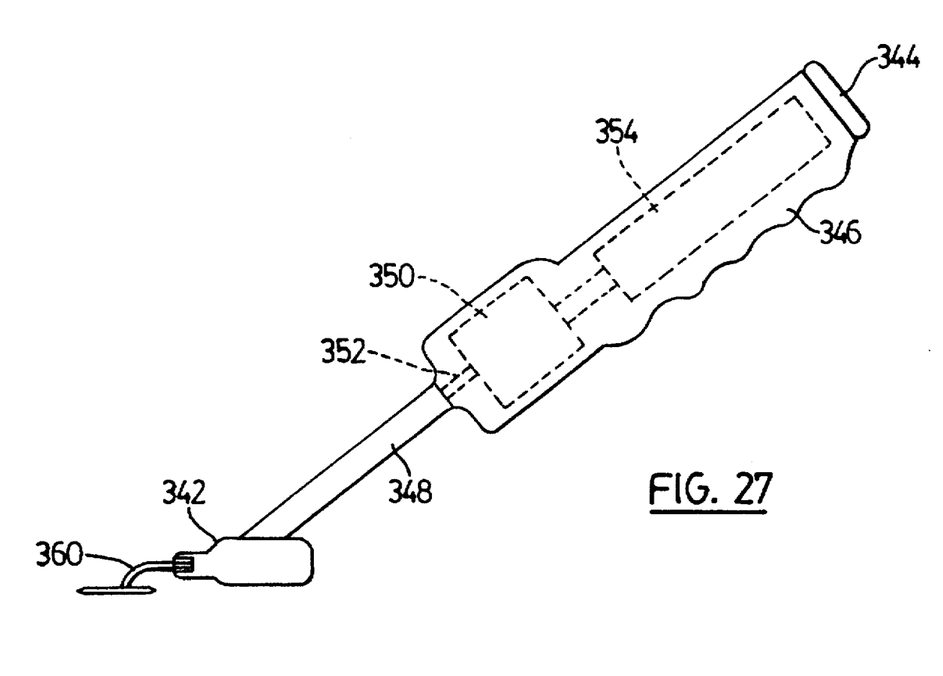
FIG. 27 is a side elevation of an additional version of the power tool of the invention, which version is battery powered and handheld.

Shown in FIG. 27 is a smaller version of a root cutting tool constructed in accordance with the invention. This version is much shorter in length and may, for example, be only 18 inches in length measured from the reciprocating drive unit 342 to the top end 344 of its handle grip 346. This power tool also has an elongate supporting member 348, although the length of this member may be one foot or less. Mounted at the upper end of this supporting member, which is preferably tubular, is an electrically operated motor 350 shown in dashed lines. This electric motor has a drive shaft at 352 which is connected to an elongate drive member (not shown) that extends through the supporting member 348. The motor 350 can be driven by a rechargeable battery pack 354 which, per se, is of known construction. These battery packs are now commonly used in portable power tools such as drills. A blade attachment 360 is detachably connected to the front end of the drive unit 342 and is reciprocated in a linear motion. The blade attachment and the drive unit can be similar in their construction to those used in the larger power tools of FIGS. 1 to 3 but can be made smaller and lighter in weight so that the complete tool can easily be held and supported by one hand of the user. The hand held unit of FIG. 26 is designed for smaller root cutting jobs and jobs where finer hand control is required, for example, in order to not damage the roots of desirable plants.

It will be seen from the foregoing description that the present invention provides a relatively simple, yet unique, power tool that can be used in gardens and on farms and that, depending upon the blade attachments provided therewith, can serve a variety of functions. Not only can the machine of the invention be used to cut off the roots of weeds below the surface of the ground, it can also be used for tilling and aerating the soil, to remove sod strips and pieces of grass, to cut or form the edges of lawns and gardens and even to form seed furrows at planting time. The machine may also be useful, particularly if provided with suitable cutting blades, to remove small trees from the ground and even to remove small rocks and stones. If the tool is provided with a variable speed control, it can operate at a variety of speeds which increases its possible uses and applications. The tool can be provided with suitable means of support, including support straps, handle grips and even supporting rollers or wheels.

The various blade attachments that can be used with the present machine are preferably made of high quality, hardened steel. These blade attachments can be sharpened along the required edges when they become dull or worn. Not only can the blade members be made of hardened steel, but also the reciprocating shaft 78 in the drive unit. The hardened shaft will have a long life when mounted in suitable low friction bushings or bearings located near both ends of the reciprocating shaft. If desired, a small shock absorber such as a spring can be incorporated within the drive unit on the reciprocating shaft 78. Such a shock absorber will help avoid damage to the machine when the blade member strikes a rock or other hard object.

The reciprocating speed of the blade member can be varied from a very low number of strokes per minute to as many as 5,000 strokes or more per minute, the maximum number of strokes depending upon the motor unit used, its power and the mechanism used to vary the rotational speed. It is also possible in some types of reciprocating drive units to vary the stroke length from as little as ¼ inch to as much as a one inch stroke. If the stroke of the blade member substantially exceeds one inch in length, it has been found that this root cutting tool becomes difficult to hold and use. Therefore a stroke length of more than one inch is not recommended.

Instead of a straight linear movement of the blade member as described, it is also possible to provide a useful power tool for cutting weeds and roots wherein the blade attachment is subjected to a circular or rotational movement in a horizontal plane. In such a power tool, the blade member would be generally planar and can be made in the manner illustrated in FIGS. 13 to 19 and 22. It can be detachably connected to an elongate shaft which is movably mounted in a suitable housing. A forward end portion of this drive shaft is mounted on a vertical pivot pin which is connected to a rotating horizontal disc member at a short radius from the center of the disc member. A rear end portion of the drive shaft can also be mounted in a similar fashion to a rotating disc member operatively connected to a motor by an elongate drive shaft and gears in the manner already described above. The two rotating discs can be quite small, for example ½ inch to ¾ inch in diameter, resulting in a small rotational movement of the blade member.

In addition to a complete power tool with a motor it is also possible to make and sell conversion kits or packages to convert an existing weed cutting power tool, such as that sold under the trade-mark WEEDEATER, to a power tool constructed in accordance with the invention. The existing known tools commonly have an elongate hollow support tube with a motor mounted at the top of the support tube and a drive shaft extending through the tube. Often there is a rotating disc in a bottom housing that feeds out and drives a flexible line used to cut weeds above ground. Taking the present invention as illustrated in FIGS. 11 and 12 as an example, the illustrated supporting member 210 and turning cable 208 could be part of an existing power tool for cutting weeds. To convert the unit, the bottom section attached to the member 210 would be disconnected as would the weed cutting device connected to the cable 208. Then these would be replaced by connecting the housing 222 (part of the conversion kit) to the bottom end of member 210 using the collar 224. Also, the disk 220 would be connected to the end of the cable 208. The housing 222 could be made in half sections to permit the connection to the cable 208 to be made as well as the assembly of the rest of the drive conversion mechanism.

It will be apparent to those skilled in the manufacture and use of power tools and garden tools that various modifications and changes can be made to the described root cutting machine and its various blade attachments without departing from the spirit and scope of this invention. Accordingly, all such modifications and changes as fall within the scope of the accompanying claims are intended to be part of this invention.

I therefore claim:

1. A root cutting machine comprising:
   an elongate, supporting member having an upper end and a lower end;
   a motor mounted at said upper end of the supporting member;
   an elongate drive member having a top end, a bottom end, and a longitudinal axis, and operatively connected at the top end to said motor for rotation about said longitudinal axis by said motor and extending along said supporting member to said lower end;
   a reciprocating drive unit mounted on said lower end of the supporting member, said drive unit including a drive conversion mechanism operatively connected to the bottom end of said drive member and capable of converting the rotary motion of said drive member to a reciprocating linear motion in a predetermined direction; and
   a blade attachment connectible to said drive conversion mechanism and having a generally planar blade member with a forwardly directed cutting edge, said blade member being mounted so that, during normal use of said machine, the blade member extends generally and continuously in a horizontal plane while being reciprocated rapidly and linearly by said drive unit, said blade attachment including a blade shaft member rigidly connected to said blade member and comprising a lower section that extends upwardly from said blade member and an upper section extending generally parallel to the plane of said blade member and rearwardly, said upper section being rigidly connected to said lower section,
   wherein during normal use of said machine, said supporting member slopes downwardly and forwardly from said upper end to said lower end, a longitudinal centerline of said supporting member defining a vertical plane, and said blade member can be reciprocated rapidly and horizontally in said predetermined direction which is a rear to front direction in relation to said machine and which is at a substantial angle, that is substantially more than zero degrees and less than 90 degrees, to said longitudinal axis of said drive member.

2. A root cutting machine according to claim 1 wherein said supporting member is hollow and tubular with a round transverse cross-section and a length of at least three feet.

3. A root cutting machine according to claim 2 including a gripping handle rigidly connected to said supporting member along an upper half thereof.

4. A root cutting machine according to claim 1 wherein said drive unit includes an exterior housing containing said drive conversion mechanism, said housing being rigidly connected to said lower end of the supporting member.

5. A root cutting machine according to claim 4 wherein said drive member is a flexible turning cable having a spindle at said bottom end thereof, said spindle being connected to said drive conversion mechanism.

6. A root cutting machine according to claim 4 wherein said housing has a front opening for a reciprocating drive shaft attachable to said upper section.

7. A root cutting machine according to claim 6 wherein said blade member has a convexly curved forward cutting edge, two opposite side edges which taper inwardly from front to back, and a rear edge, said side edges and said rear edge also being sharpened to provide cutting edges.

8. A root cutting machine according to claim 7 wherein at least said side edges are serrated and wherein said side edges are both substantially shorter than said forward cutting edge and said rear edge.

9. A root cutting machine according to claim 6 wherein said motor is electrically driven.

10. A weed cutting power tool for cutting roots of weeds below the ground surface comprising:
    an elongate supporting member having an upper end and a lower end;
    a motor mounted at said upper end of the supporting member;
    an elongate drive member having a top end operatively connected to said motor, a bottom end, and a longitudinal central axis about which said drive member is rotatable by said motor, said drive member extending along said supporting member to said lower end;
    a reciprocating drive unit mounted on said lower end of the supporting member, said drive unit including a drive conversion mechanism capable of converting the rotary motion of said drive member to a reciprocating linear motion which is a generally horizontal motion during use of said tool, said drive conversion mechanism including a gear mechanism operatively connected to said bottom end of the drive member;
    a generally planar blade member with at least one cutting edge; and
    a reciprocating shaft mechanism rigidly connected to said blade member and connected to said drive conversion mechanism, said shaft mechanism comprising a lower section that extends upwardly from said blade member and an upper section extending generally parallel to the plane of said blade member and rearwardly, said upper section being rigidly connected to said lower section;
    at least one shaft supporting device mounted at the lower end of the supporting member and arranged to support said shaft mechanism for reciprocating linear movement, wherein, in use of said tool, said blade member undergoes reciprocating linear motion in a generally horizontal direction and said blade member during said motion extends generally and continuously in a horizontal plane.

11. A weed cutting power tool according to claim 10 wherein said drive unit includes an exterior housing containing both said drive conversion mechanism and said at least one shaft supporting device, said exterior housing being rigidly connected to the supporting member.

12. A weed cutting power tool according to claim 11 wherein said supporting member is tubular with a round cross-section and a length of at least three feet and said drive member extends through said supporting member.

13. A weed cutting power tool according to claim 10 wherein, during use of said tool, said supporting member slopes downwardly and forwardly from said upper end to said lower end and a longitudinal centerline of said supporting member defines a vertical plane, and wherein said blade member is reciprocated rapidly by said motor in a rear to front direction relative to the position of said tool.

14. A weed cutting power tool according to claim 13 wherein said blade member has a slightly curved front edge, two opposite side edges, and a rear edge, said front and rear edges being substantially longer than said side edges.

15. A weed cutting power tool according to claim 10 wherein said gear mechanism includes a drive gear fixedly connected to said bottom end of the drive member and a rotatable driven gear engaged by said drive gear.

16. A weed cutting power tool according to claim 15 wherein said drive gear is a bevel gear and said driven gear is a rotatable disc with teeth extending around an upper surface thereof and an offset downward extension, the latter extending into an elongate slot formed in a drive connecting member fixed to said shaft mechanism.

17. A weed cutting power tool for cutting roots of weeds below the ground surface comprising:

an elongate supporting member having an upper end and a lower end;

a motor mounted at said upper end of the supporting member;

an elongate drive member having a top end operatively connected to said motor, a bottom end, and a longitudinal central axis about which said drive member is rotatable by said motor, said drive member extending along said supporting member to said lower end;

a reciprocating drive unit mounted on said lower end of the supporting member, said drive unit including an exterior housing rigidly connected to the supporting member, and a drive conversion mechanism capable of converting the rotary motion of said drive member to a reciprocating linear motion which is a generally horizontal motion during use of said tool, said drive conversion mechanism being contained within said exterior housing and including a gear mechanism operatively connected to said bottom end of the drive member;

a blade member with at least one cutting edge;

a reciprocating shaft mechanism rigidly connected to said blade member and connected to said drive conversion mechanism; and at least one shaft supporting device contained in said exterior housing mounted at the lower end of the supporting member, and arranged to support said shaft mechanism for reciprocating linear movement, wherein said at least one shaft supporting device is two spaced apart shaft bushings which are fixedly mounted respectively near front and rear ends of said housing and wherein, in use of said tool, said blade member undergoes reciprocating linear motion in a generally horizontal direction.

18. A root cutting machine comprising:

an elongate, supporting apparatus having two opposite ends and a central longitudinal axis;

a motor mounted on said supporting apparatus;

an elongate drive member connected to said motor and rotatable thereby, said drive member having an end located at one end of said supporting apparatus;

a reciprocating drive unit mounted at said one end of said supporting apparatus, said drive unit including a drive conversion mechanism operatively connected to said end of said drive member and capable of converting the rotary motion of said drive member to a reciprocating linear motion in a predetermined plane which is at a substantial angle of less than 90 degrees and substantially more than zero degrees to said longitudinal axis; and a blade attachment connectible to said drive conversion mechanism and having a blade member with a cutting edge, said blade attachment including a shaft mechanism comprising a lower section that is rigidly attached to said blade member and extends upwardly therefrom and an upper section that extends generally parallel to the plane of said blade member and rearwardly, said upper section being rigidly connected to said lower section, wherein during use of the machine, said blade attachment is reciprocated rapidly and linearly in said predetermined plane by said motor and said blade member extends generally and continuously in a horizontal plane.

19. A root cutting machine according to claim 18 wherein said motor is an electric motor mounted near said one end of said supporting apparatus.

20. A root cutting machine according to claim 19 wherein said supporting apparatus comprises a hollow tube and an electrical cord extending through said tube to said electric motor.

21. A root cutting machine according to claim 19 including a cushioned handle grip fixedly mounted on and extending along said supporting apparatus in a central section thereof.

22. A root cutting machine according to claim 18 wherein said drive conversion mechanism is a gear mechanism including a drive gear connected to said drive member and a rotatable driven gear engaged by said drive gear.

23. A root cutting machine according to claim 22 wherein said drive unit includes an exterior housing containing said drive conversion mechanism, said housing being rigidly connected to said one end of the supporting apparatus.

24. A root cutting power tool comprising:

an elongate, supporting member having an upper end, a lower end, and a central, longitudinal axis;

a motor mounted on said supporting member;

a first drive member connected to said motor and rotatable thereby about a central axis of said drive member;

a drive unit mounted at said lower end of the supporting member, said drive unit including a second drive member and one or more supporting devices for movably supporting said second drive member, said second drive member being operatively connected to an end of said first drive member and being movable in a positive manner by said first drive member in a plane disposed at a substantial angle of less than 90 degrees and substantially more than zero degrees to said longitudinal axis; and a substantially planar blade member rigidly connected to said second drive member and having at least a forward cutting edge, said second drive member comprising a lower section that is attached to said blade member and extends upwardly therefrom and an upper section that extends generally parallel to the plane of said blade member and is rigidly connected to said lower section;

wherein, during use of said power tool, said supporting member is arranged by a user to slope downwardly and forwardly from said upper end and at the same time said blade member is moved rapidly in a generally horizontal plane disposed below the ground's surface while said blade member extends generally and continuously in a horizontal plane.

25. A root cutting power tool according to claim 24 wherein said motor is mounted at said upper end of the supporting member and said first drive member is elongate and extends along said supporting member from said motor to said lower end of the supporting member.

26. A root cutting power tool according to claim 25 wherein said drive unit includes a housing containing said second drive member and said one or more supporting devices.

27. A root cutting power tool according to claim 26 including a shock absorber provided in a forward section of said drive shaft, which is divided into two shaft sections by said shock absorber.

* * * * *